United States Patent [19]

Prichard

[11] Patent Number: 4,636,872
[45] Date of Patent: Jan. 13, 1987

[54] LASER IMAGING SYSTEM AND METHOD FOR IMPOSING PAGES FOR PRINTING

[75] Inventor: Robert J. Prichard, Anaheim, Calif.

[73] Assignee: Gerber Scientific Instrument Company, Tustin, Calif.

[21] Appl. No.: 803,788

[22] Filed: Dec. 2, 1985

Related U.S. Application Data

[63] Continuation of Ser. No. 618,589, Jun. 8, 1984, abandoned.

[51] Int. Cl.[4] .................. H04N 1/21; H04N 1/23; G01D 9/42
[52] U.S. Cl. .................... 358/296; 346/108; 354/5; 358/302; 364/519
[58] Field of Search ............... 358/296, 297, 300, 302; 346/108, 160, 76 L; 364/518, 519, 523; 354/5

[56] References Cited

U.S. PATENT DOCUMENTS 4,214,276  7/1980  Pugsley et al. ............ 354/5 X
4,240,119  12/1980  Norton et al. ............. 358/302 X
4,393,411  7/1983  Amtower ................... 358/302

FOREIGN PATENT DOCUMENTS 0084627  7/1978  Japan ........................ 364/519

Primary Examiner—E. A. Goldberg
Assistant Examiner—Patrick W. Foster
Attorney, Agent, or Firm—McCormick, Paulding & Huber

[57] ABSTRACT

Laser imaging system and method for imaging a plurality of printed pages on an output medium in positions and orientations corresponding to an imposition format. Different areas of the medium are scanned to form the images for different pages with the beam traveling and being modulated to provide the proper orientation and position for each page.

12 Claims, 4 Drawing Figures

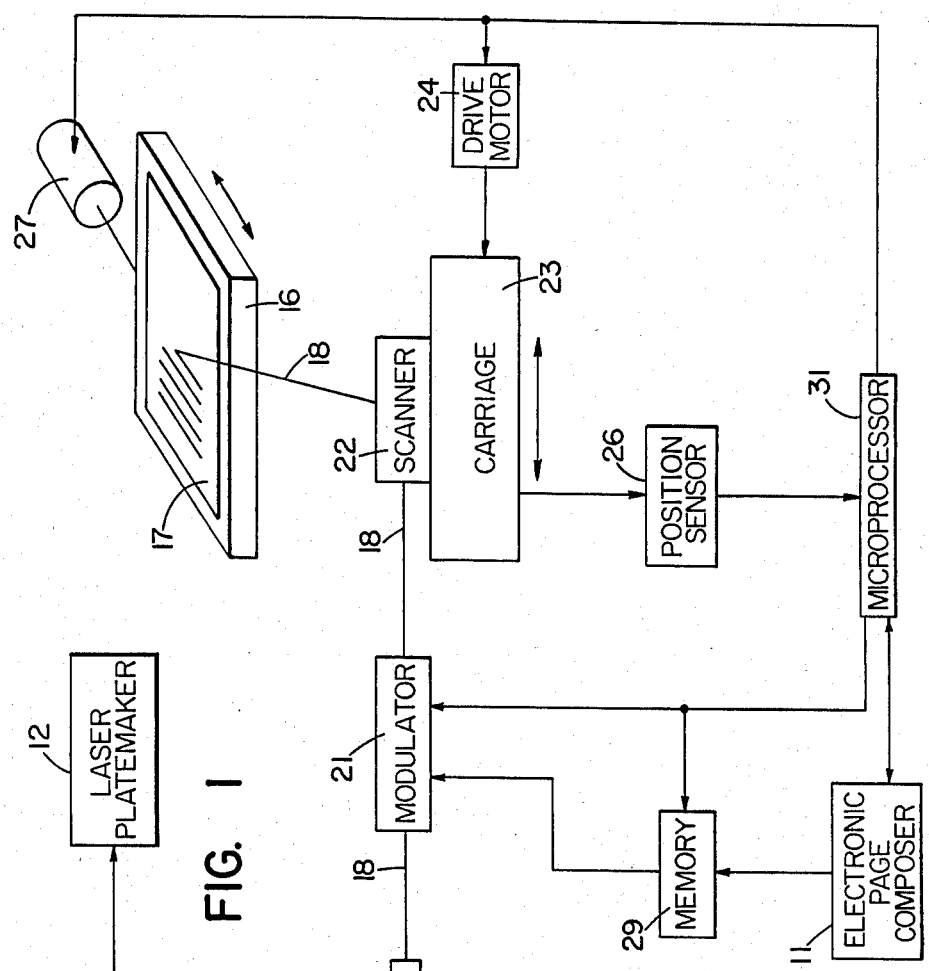
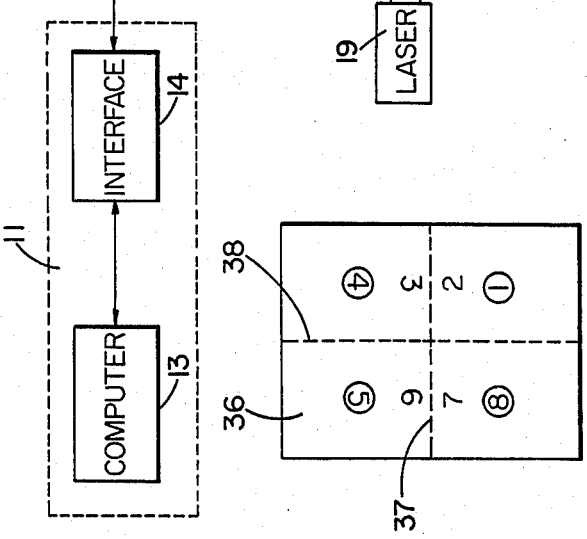
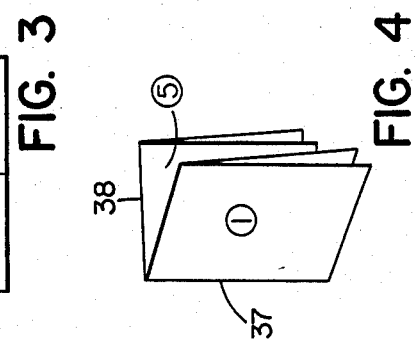

LASER IMAGING SYSTEM AND METHOD FOR IMPOSING PAGES FOR PRINTING

This is a continuation of co-pending application Ser. No. 618,589 filed on June 8, 1984 now abandoned.

This invention pertains generally to laser imaging systems and methods, and more particularly to a system and method for imaging a plurality of pages with the proper orientations and positions for printing in an imposition format.

In the printing of books and other publications, a plurality of pages are printed on a single sheet which is then folded to form a series of imposed pages known as a signature. In order for the pages to appear in the proper sequence and orientation in the signature, they must be positioned and oriented properly on the sheet which is folded. The positioning and orientation of the pages on the sheet is known as the imposition format.

In recent years, electronic page composition systems and laser platemakers have provided greatly enhanced flexibility and speed in page composition and plate making. An example of a laser platemaker is found in U.S. Pat. No. 4,393,411, and an example of a computerized composition and plate making system is found in U.S. Pat. No. 4,240,119. In these systems, the output medium is generally scanned in raster fashion to form an image of the page to be printed. Since the scanning is done in a single, fixed direction, e.g. from top to bottom of the page, these systems have heretofore not been suitable for use in the preparation of impositions where different orientations and positions are required for different pages.

It is in general an object of the invention to provide a new and improved laser imaging system and method which overcome the foregoing and other limitations and disadvantages of laser imaging systems heretofore provided.

Another object of the invention is to provide a system and method of the above character which can image a plurality of pages on an output medium with the orientations and positions required for an imposition format.

These and other objects are achieved in accordance with the invention by scanning one area of a printing plate or other output medium with a laser beam to form an image of one of the pages to be printed, then scanning a second area of the medium with the beam to form an image of a second page. In each area, the direction of beam travel and the data with which the beam is modulated provide the proper orientation and position of the image for the imposition format. In one disclosed embodiment, the images are formed in head-to-head relationship toward opposite ends of the output medium. The beam is advanced to a central position between the ends of the medium, then turned on and scanned in a first direction to image one of the pages in right reading relationship in raster fashion between the central position and one end of the output medium. Thereafter, the beam is returned to the central position, then turned on and scanned in the opposite direction to image a second page in wrong reading relationship between the central position and the other end of the medium. The output medium can be shifted laterally to image additional pages beside the first two.

FIG. 1 is a block diagram of one embodiment of a laser imaging system according to the invention.

FIG. 2 is a simplified block diagram of the laser platemaker in the imaging system of FIG. 1.

FIG. 3 is a plan view of a sheet with an imposition format printed in accordance with the invention.

FIG. 4 is a schematic drawing of the sheet of FIG. 3 folded to form a signature.

As illustrated in FIG. 1, the laser imaging system includes an electronic page composer 11 and a laser platemaker 12. This system can be utilized in the production of plates for different types of printing systems including offset lithography, direct lithography (dilitho) and letter press systems. For offset and dilitho systems, the output medium on which the image is formed is the plate itself, and for letter press systems the output medium is a film negative from which the plate is made.

The page composer includes a computer 13 and an interface 14 which can, for example, be of the type described in detail in U.S. Pat. No. 4,240,119. The computer has a keyboard through which data and commands can be entered into the system, and it delivers data and control signals to the platemaker.

The platemaker can be of the flatbed type described in U.S. Pat. No. 4,240,119 or in U.S. Pat. No. 4,393,411, or it can be of another suitable type such as a drum scanner. In addition to the elements shown in FIG. 2, it can include a reading system for scanning data from input copy on a read platen. Data read from the input copy can be transferred to the computer via the interface unit, where it can be stored and combined with data input through the computer for presentation to the platemaker. Plates or negatives can be imaged in three different modes of operation: (1) a local mode in which data read from the read platen is imaged directly on the output medium, (2) a computer mode in which data from the computer is imaged on the output medium, and (3) a merge mode in which data from the computer is combined with data from the read platen and imaged on the output medium. In addition, data stored in the computer memory for individual files or raster images can be combined to produce a complete page or other composite raster image.

As illustrated in FIG. 2, the platemaker includes a write platen 16 on which the printing plate or output medium 17 is mounted. A writing beam 18 produced by a laser 19 is modulated by modulator 21 in accordance with the data to be imaged on the output medium. The modulated beam is directed to a scanner 22 which causes the beam to scan laterally across the output medium. The scanner is mounted on a carriage 23 which is driven by a reversible drive motor 24 in a direction generally parallel to the longitudinal axis of the output medium. As the carriage advances, the scanner scans the beam over the output medium in raster fashion.

A position sensor 26 monitors the longitudinal position of the carriage. In one presently preferred embodiment, this sensor includes limit switches which are actuated when the carriage reaches opposite ends of its travel. The sensor also includes an optical encoder which provides a signal corresponding to the position of the carriage between the extremes of its travel. If desired, this signal can also be utilized to indicate the end points of the carriage travel.

Means is also provided for shifting the position of the write platen in the lateral direction to permit images of pages to be formed side by side on the output medium. In the embodiment illustrated, this means includes a lateral positioning motor 27 connected to the write platen, and the platen can also be positioned manually, if desired.

Data from the electronic page composer 11 is applied to the modulating input of modulator 21 via a memory 29. Data is read into this memory one line at a time, and it can be read out of the memory either in a forward direction for read-right imaging or in a reverse direction for read-wrong imaging. Data read out of the memory can also be complemented to produce negative images, as in the exposure of negatives for letter press plates.

Operation of the platemaker is controlled by a microprocessor 31 which receives inputs from electronic page composer 11 and carriage position sensor 26. The processor delivers output signals to the page composer and to various elements of the platemaker including modulator 26, memory 29, drive motor 24 and lateral positioning motor 27.

Operation and use of the imaging system, and therein the method of the invention, can be described with reference to the imposition format of FIG. 3. This figure illustrates a sheet 36 having an imposition format for the 8-page signature shown in FIG. 4. Each side of the sheet is divided into four areas by fold lines 37, 38, and the numbers on the sheet designate the pages to be printed in the different areas. The circled numbers represent pages to be printed on the front side of the sheet, and the uncircled numbers represent pages to be printed on the back side. The numbers are oriented in accordance with the directions in which the respective pages should face when they are printed. Thus, pages 1 and 8 are printed side by side on the lower half of the front side of the sheet, pages 4 and 5 are printed upside down on the upper half of the front side, pages 2 and 7 are printed right side up on the lower half of the back side, and pages 3 and 6 are printed upside down on the upper half of the back side. After all of the pages have been printed, the top half of the sheet is folded rearwardly and down along line 37, then the sheet is folded along line 38 to form the signature shown in FIG. 4.

A printing plate for printing the front side of the imposition format illustrated in FIG. 3 in an offset process is produced by mounting the plate in a fixed position on write platen 16. Drive motor 24 is actuated to advance carriage 23 at a relatively high speed from its home position near one end of its travel to a central position in which the beam is located midway between the ends of the output medium. Once the carriage reaches the central position, the drive motor advances the carriage at the normal scanning speed in the forward direction, and the beam is turned on and modulated with data for imaging pages 1 and 8 in a read-right fashion on the lower half of the output medium. When these images have been formed, the writing beam is turned off, and the drive motor is reversed to return the carriage to the central position at the relatively high speed. Thereafter, the drive motor advances the carriage back toward the home position at the normal scanning speed, and the writing beam is turned on and modulated with data to image pages 4 and 5 in an inverted position on the top half of the plate. These pages are imaged from top to bottom in a read-wrong fashion as the beam travels from the center of the plate toward the top edge of the plate. A plate for printing the back side of sheet 36 can be prepared in a similar manner.

A plate for dilitho printing is produced in a similar manner, with the images reversed so that the pages on the bottom half of the plate are imaged in a read-wrong fashion and the pages on the top are imaged in a read-right relationship. For a negative, the data with which the beam is modulated is complemented to produce the negative image.

A wide variety of imposition formats can be produced with the invention. Additional pages can be imaged both at the sides and at the ends of the original pages simply by shifting the output medium laterally or longitudinally.

In the embodiment disclosed, proper orientation of the images for different pages is achieved by the direction in which the pages are scanned and the order in which the data for each scan line is read out of memory 29. The orientation and positioning of the images can also be controlled by the computer and the page composer, in which case the images can be oriented in other directions by rotation of the data supplied to the platemaker. In this manner, for example, the output images can be rotated 90° to produce plates for printing tabloid newspaper plates side by side.

While the invention has been described with specific reference to printing plates and negatives for making printing plates, it can also be utilized with other photosensitive materials such as films, papers, and proofing materials. For example, images can be formed directly on DYLUX (DuPont trademark) paper for proofing purposes.

It is apparent from the foregoing that a new and improved laser imaging system and method have been provided. While only certain presently preferred embodiments have been described in detail, as will be apparent to those familiar with the art, certain changes and modifications can be made without departing from the scope of the invention as defined by the following claims.

I claim:

1. In a system for imaging a plurality of printed pages on an output medium in positions and orientations corresponding to an imposition format: means for scanning a first area of the output medium with a laser beam to form an image of one of the pages in the first area, and means for scanning a second area of the output medium with a laser beam to form an image of a second one of the pages in the second area, said first and second areas being positioned toward opposite ends of the output medium, and said means for scanning the areas including means for advancing the beam to a central position between the ends of the output medium, means for scanning the output medium in raster fashion between the central position and one end of the medium to form the image of the first page, means for returning the beam to the central position, and means for scanning the output medium in raster fashion between the central position and the opposite end of the medium to form the image of the second page.

2. The system of claim 1 wherein the image of the first page is formed from top to bottom in a right reading manner, and the image of the second page is formed from top to bottom in a wrong reading manner.

3. In a method of imaging a plurality of pages on an output medium in positions and orientations corresponding to an imposition format, the steps of: scanning a first area of the output medium with a laser beam to form an image of one of the pages in the first area, and scanning a second area of the output medium with the laser beam to form an image of a second one of the pages in the second area, said steps of scanning said first and second areas of said output medium including the step of advancing the beam to a central position between the ends of the output medium, scanning the medium in raster fashion between the central position and one end of the medium to form the image of the first page, returning the beam to the central position, and scanning the output medium in raster fashion between the central position and the other end to form the image of the second page.

4. The method of claim 3 wherein the image of the first page is formed from top to bottom in a right reading manner, and the image of the second page is formed from top to bottom in a wrong reading manner.

5. In a system for imaging a plurality of printed pages on a output medium in positions and orientations corresponding to an imposition format: a carriage movable in a longitudinal direction relative to the output medium between a home position and a remote position, drive means for advancing the carriage between the home and remote positions, means mounted on the carriage for deflecting a laser beam in a direction generally perpendicular to the direction of carriage movement to scan the output member in raster fashion along successive scan lines, means for modulating the laser beam in accordance with the images to be formed, means for actuating the drive means at a relatively high speed in a forward direction to advance the carriage to a central position between the home position and the remote position with the beam turned off, means for advancing the drive means at a normal scanning speed in the forward direction to drive the carriage from the central position to the remote position with the beam turned on and modulated in accordance with data for the first page, means for actuating the drive means at a relatively high speed in a reverse direction to return the carriage to the central position with the beam turned off, and means for actuating the drive means at the normal scanning speed in the reverse direction with the beam turned on and modulated in accordance with data for the second page.

6. The system of claim 5 wherein the output medium is a printing plate.

7. The system of claim 5 wherein the beam is modulated to image the first page from top to bottom in right reading fashion and to image the second page from top to bottom in wrong reading fashion.

8. The system of claim 5 including means for shifting the output medium laterally to position the beam in different areas displaced laterally of each other on the output medium.

9. In a system for imaging a plurality of printed pages on an output medium having opposite longitudinal ends in positions and orientations corresponding to an imposition format, means for scanning a first area of the output medium with a laser beam to form an image of at least one of the pages in the first area, and means for scanning a second area of the output medium with a laser beam to form an image of at least a second one of the pages in the second area, said first and second areas being positioned on opposite sides of a dividing line extending transversely across said output medium intermediate said longitudinal ends of said output medium, said first and second areas having first longitudinal ends forming a pair of ends and having second longitudinal ends forming another pair of ends, the ends of one of said pairs being located adjacent said dividing line and the ends of the other of said pairs being remote from said dividing line, and said means for scanning said areas including means for advancing the beam to said first lonigtudinal end of said first area, means for scanning the output medium with said beam in raster fashion between said first and second longitudinal ends of said first area to form the image of said at least one page in said first area, means for then advancing the beam to said first longitudinal end of said second area, and means for then scanning the output medium with said beam in raster fashion between said first and second longitudinal ends of said second area to form the image of said at least second page in said second area.

10. The combination defined in claim 9 further characterized by means for modulating said beam in a right reading manner as it is scanned over one of said areas, and means for modulating said beam in a wrong reading manner as it is scanned over the other of said areas.

11. A method for imaging a plurality of printed pages on an output medium having opposite longitudinal ends in positions and orientations corresponding to an imposition format, said method comprising scanning a first area of an output medium such as aforesaid with a laser beam to form an image of at least one of the pages in the first area, and scanning a second area of the output medium with a laser beam to form an image of at least a second one of the pages in the second area, said first and second areas being positioned on opposite sides of a dividing line extending transversely across said output medium intermediate said longitudinal ends of said output medium, said first and second areas having first longitudinal ends forming a pair of ends and having second longitudinal ends forming another pair of ends, the ends of one of said pairs being located adjacent said dividing line and the ends of the other of said pairs being remote from said dividing line, said step of scanning said areas including advancing said beam to said first longitudinal end of said first area, scanning the output medium with said beam in raster fashion between said first and second longitudinal ends of said first area to form the image of said at least one page in said first area, then advancing the beam to said first longitudinal end of said second area and scanning the output medium with said beam in raster fashion between said first and second longitudinal ends of said second area to form the image of said at least second page in said second area.

12. The method defined in claim 11 further characterized by modulating said beam in a right reading manner as it is scanned over one of said areas, and modulating said beam in a wrong reading manner as it is scanned over the other of said areas.

* * * * *